Nov. 18, 1924.
H. F. FRENCH ET AL
1,515,652
ELECTRIC BATTERY
Filed July 30, 1919      2 Sheets-Sheet 1
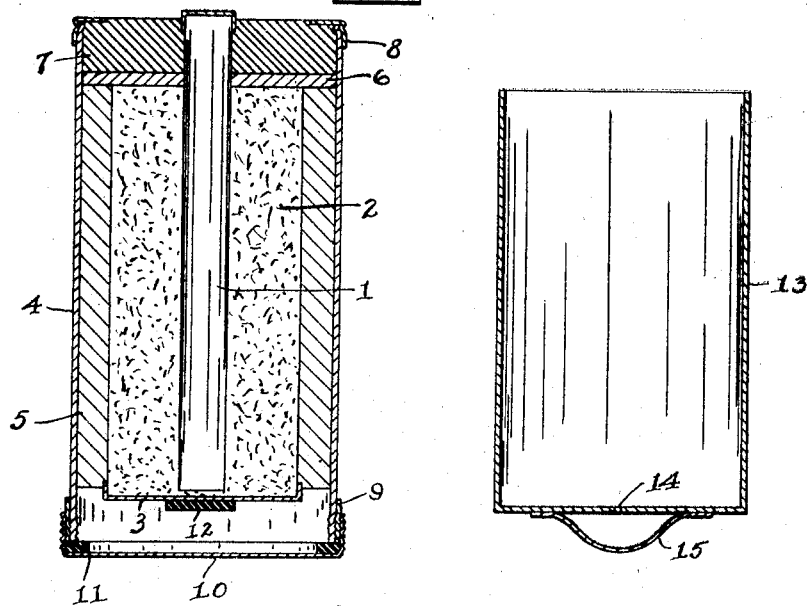
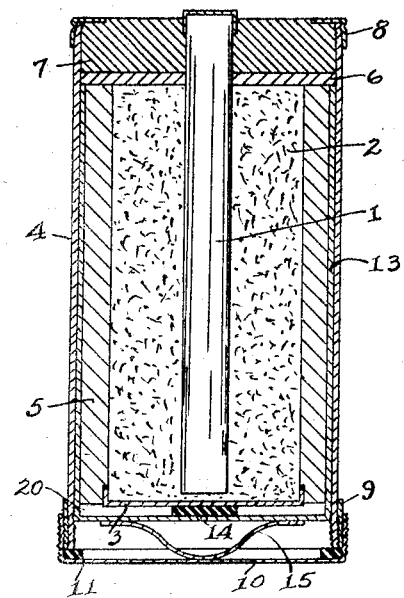
INVENTOR
H. F. FRENCH
and R. C. BENNER
BY
ATTORNEY

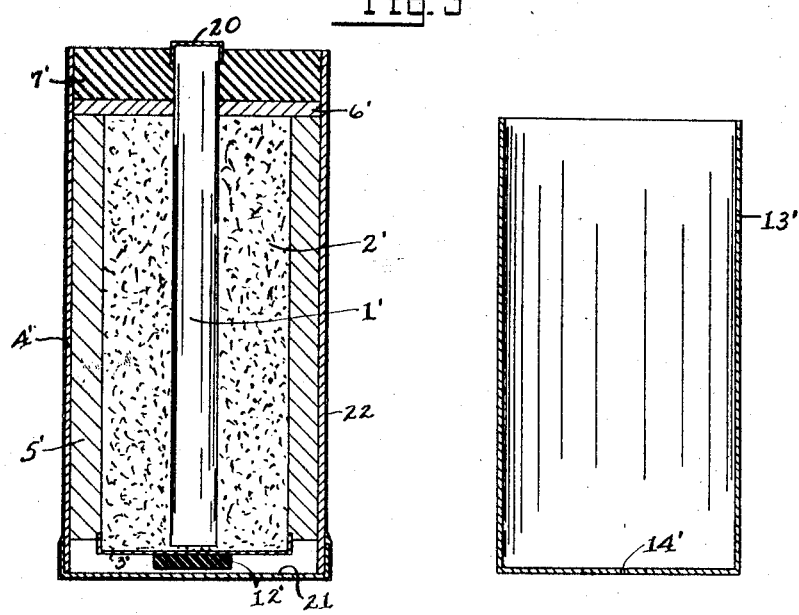
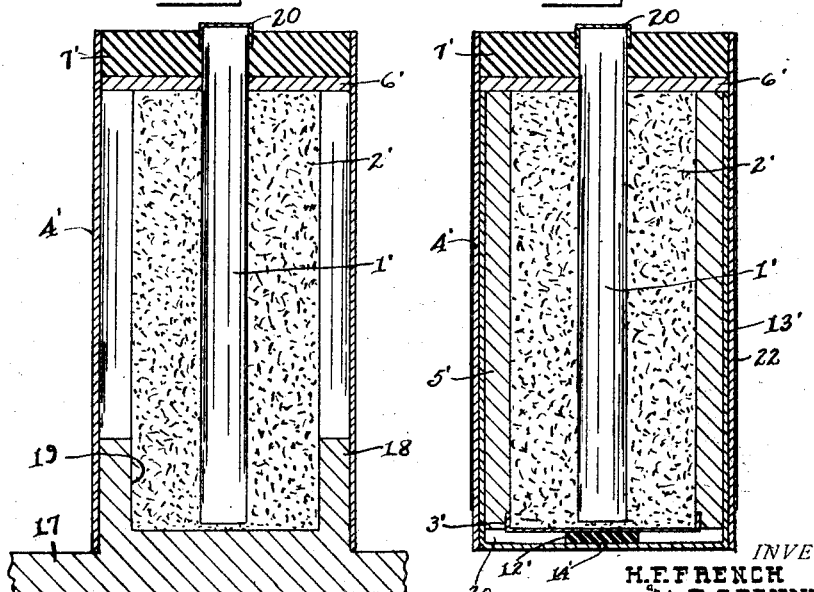
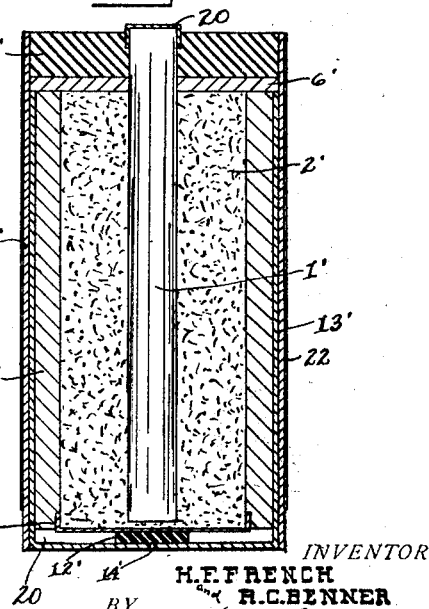

Patented Nov. 18, 1924.

1,515,652

UNITED STATES PATENT OFFICE.

HARRY F. FRENCH AND RAYMOND C. BENNER, OF FREMONT, OHIO, ASSIGNORS TO NATIONAL CARBON COMPANY, INC., A CORPORATION OF NEW YORK.

ELECTRIC BATTERY.

Application filed July 30, 1919. Serial No. 314,197.

*To all whom it may concern:*

Be it known that we, HARRY F. FRENCH and RAYMOND C. BENNER, citizens of the United States, and residents, respectively, of Fremont, in the county of Sandusky and State of Ohio, and Fremont, in the county of Sandusky and State of Ohio, have invented a certain new and useful Improvement in Electric Batteries, of which the following is a full, clear, and exact description.

This invention relates to batteries involving the LeClanche combination of zinc and carbon electrodes and a depolarizer of manganese dioxide. This kind of battery is commonly known as a "dry cell," although the ordinary dry cell has a moist depolarizing mix. On account of the moist mix, local action on the surface of the zinc results even when the dry cell is not in service, and various other phenomena cause the cells to deteriorate before they are put in service and during rest periods.

To eliminate this loss which is generally designated "shelf life" deterioration, various cells using the LeClanche combination have been devised in which the cell is not in condition for generating current until certain operations are performed which render it active. The most common cell of the latter type has a dry depolarizing mix which is moistened by adding a suitable liquid to put the cell in an active condition. This method which is quite generally used commercially has the disadvantage that it requires a considerable time for the mix to soak up the liquid and reach full amperage. By this method it is also very difficult to thoroughly moisten the mix to the proper wetness.

The principal object of the present invention is to eliminate the undesirable features mentioned to secure a cell of the type referred to, which assumes full amperage almost immediately after it is put in service.

One of the important features of the present invention is the use in a reserve cell of mix which has been moistened in the same manner as the usual dry cell mix, in combination with the structural features to be more fully described.

Further advantages of the present structure will be referred to in connection with the following description of a dry cell embodying the invention.

In the drawings:—

Fig. 1 is a vertical cross sectional view of the elements of a finished dry cell when in an inactive condition.

Fig. 2 is a vertical cross sectional view of the cell when the elements are combined in the relative positions required for generating current.

Fig. 3 is a vertical cross section of a somewhat simplified modification with the elements in an inactive condition.

Fig. 4 is a vertical cross sectional view of the simplified modification when the elements are combined in the relative positions required for generating current.

Fig. 5 is a vertical cross section illustrating a portion of one method for assembling the cartridge and carton.

There are a number of methods which could be used in assembling the various elements, but as my invention is not limited thereto, the cell will first be described without reference to the method by which the elements are assembled in the desired relationship.

In the inactive condition the cell is divided into two parts, as shown in Figs. 1 and 3, the zinc electrode being separate and apart from the other elements. The cell shown in Figs. 1 and 2 comprises a bobbin consisting of a central carbon electrode 1 having the lower portion surrounded by a moist depolarizing mix 2 containing manganese dioxide, carbon, zinc chloride and ammonium chloride. The flat end of the mix is provided with an insulating cap 3 which may consist for example of paraffined or tar treated paper. The entire bobbin is surrounded by a waterproofed cardboard carton 4 spaced from the bobbin, the intermediate space between the mix and the carton being filled with a thickened or gelatinous paste 5 made from cereal flour, water and electrolyte solution. The space between the projecting end of the carbon electrode and the adjacent end of the carbon is filled by an insulating disk 6 adjacent the mix, and a pitch seal 7 which closes the end of the carton. In actual practice the carton used has consisted of an ordinary mailing tube having a metal flange 8 crimped on the end of the carton containing the seal. The metal flange considerably increases the strength of the carton and acts to some degree to retain the seal.

The other end of the carton which extends a short distance beyond the paste 5 and mix cap 3 is provided with a threaded metallic ring 9 fastened to the carton in a suitable manner and adapted to receive a threaded metal cover 10 having a gasket 11 therein. The paste 5 may be made thick enough so that it will not run out into the cover 10 in case the cell is carried in the position shown in Figs. 1 and 2. A paraffined felt sealing button 12 is attached to the center of the insulating cap 3 for a purpose which will be referred to hereafter. The zinc electrode consists of an ordinary zinc can 13 having a vent hole 14, preferably consisting of a single hole located in the center of the bottom. The outside diameter of the zinc can is approximately equal to the inside diameter of the carton. A spring 15 is soldered or otherwise attached to the bottom of the zinc can as illustrated in the drawings.

In Fig. 3 and 4 we have shown a somewhat simplified modification in which we have eliminated the metal flange 8, the metal ring 9, metal cap 10, gasket 11 and spring 15. The remaining elements which are indicated by the same reference characters with a prime mark (′) added, are assembled in the same relationship as in Figs. 1 and 2. No element is substituted for the metal flange 8, ring 9 or spring 15, but instead of the metal cover 10 and gasket 11 we use a paper cover 21 which is fitted over the end of the carton. The cover is then waterproofed and secured to the carton by dipping the end of the carbon in paraffine, or the entire carton and cover may be waterproofed by dipping in paraffine.

Whenever it is desired to place the cell shown in Figs. 1 and 2 in action, the cover 10 is removed and the zinc can is slowly pressed into the paste 5, the cell preferably being meanwhile held in an inverted position. All of the air in the can except that in the air chamber 20 escapes through the vent hole 14 which is closed when the bottom of the can 13 touches the sealing button 12. It has been found that the zinc can may be easily forced into the paste 5 in this manner and by having the carton and zinc can of proper diameters practically all of the paste will be forced inside the zinc can and very little will remain between the zinc can and carton. When the cover 10 is screwed on the ring 9 to seal the battery, electrical connection is made between the zinc can 13 and metal cover 10 by means of the spring 15.

Cells of the simplified construction are made active in a similar manner by removing the paper cover 21 and forcing the zinc can into the paste. The paper cap is not replaced, however, and the bottom of the zinc can serves as terminal instead of the screw cap of the first modification.

It has been found that as soon as the zinc is inserted in the paste either type of cell assumes practically full amperage on account of the intimate contact between the zinc can, the moist conducting paste and moist mix. The covers 10 or 21 seal the cells so that no moisture is lost by the mix and paste at any time.

The terminals of the dry cell when ready for service are provided by the cap 16 of the carbon electrode, and the cover 10 in the modification of Figs. 1 and 2. If desired, the metal flange 8 may be made a terminal by electrically connecting this flange with the threaded ring 9. The carbon electrode and flange may be provided with binding posts in a well known manner, the desirability of this depending on the service for which the cells are intended.

In the modifications of Figs. 3 and 4 the opposite ends of the cell are utilized as opposite poles or terminals, which is often desirable, although we may attach terminals to the opposite poles in any convenient manner.

Another feature worthy of particular mention is the shorter zinc can which may be used in this construction on account of the elimination of the zinc which ordinarily surrounds the seal and is only required for mechanical purposes.

While this invention is in no way limited to the method of assembling the various elements described, in Fig. 5 a desirable manner of assembling is illustrated, which is applicable to either modification although described specifically in connection with the simplified modification. A block 17 having an upstanding ring 18 provides a depression 19 for receiving a formed bobbin. The disk 6′ will be fitted over the carbon electrode and the bobbin placed in the depression 19. The carton 4′ is next slipped over the disk 6′ and the ring 18 which serve to properly center the bobbin in the carton. The pitch seal 7′ will then be poured in the space above the disk 6′ and when the pitch hardens the carton may be turned over and the space between the mix 2′ and carton 4′ filled with paste. The insulating disk 3′ having the sealing button 12′ may then be applied to the carton and the cover 21 fitted on the open end. The entire cell will then be waterproofed to seal the carton and cap and prevent the paste from drying out.

It will be evident to one skilled in the art that the construction may readily be varied to incorporate therein many of the features of construction which have been used in dry cells, and the present invention is not limited to the structural details shown.

Having described our invention, what we claim is:—

1. In electric batteries, a moist mix, an electrode in said mix, an insulating carton surrounding the mix, means for closing one end of the carton, a removable cover on the other end of the carton and a second electrode adapted to be inserted in the carton around the mix when the cover is removed.

2. In electric batteries, a moist mix, an electrode in said mix, an insulating carton surrounding the mix, a seal in one end of the carton, a removable cover on the other end of the carton and a tubular electrode adapted to be inserted in said carton to surround the mix when the cover is removed.

3. In electric batteries, a moist mix, an electrode in said mix, an insulating carton surrounding the mix, a seal in one end of the carton, a filling of paste between the carton and the mix, a removable cover on the other end of the carton, and a tubular electrode adapted to be inserted in said paste upon removing the cover.

4. In electric batteries, a moist mix, a carbon electrode in said mix, an insulating carton surrounding the mix, means for closing one end of the carton, a filling of paste between the carton and mix, a removable cover on the other end of the carton, a zinc container electrode adapted to be inserted in said paste upon removing the cover, and means adapted to provide an air-tight joint between the carton and cover.

5. In electric batteries, a moist mix, an electrode in said mix, an insulating carton surrounding the electrode and mix and spaced therefrom, a seal in one end of the carton, a filling of paste between the mix and carton, a removable cover attached to the other end of the carton, and a sheet metal container electrode having a portion adapted to be inserted in the paste upon removing the cover.

6. In electric batteries, a moist mix, a carbon electrode in said mix having an end projecting therefrom, an insulating cap at the other end of the mix, an insulating carton surrounding the carbon electrode and mix and spaced therefrom, a seal in one end of the carton surrounding the projecting end of the carbon electrode, a filling of paste between the mix and carton, means for attaching a cover to the end of the carton opposite the end containing the seal, said means being adapted to provide an airtight seal between the carton and cover, and a zinc container electrode adapted to be inserted in the paste adjacent the carton upon removing the cover, said container having a vent hole in the bottom thereof.

7. In electric batteries, a moist mix, a carbon electrode in said mix having an end projecting therefrom, an insulating cap at the other end of the mix, an insulating carton surrounding said carbon electrode and mixed and spaced therefrom, a seal at one end of the carton surrounding the projecting end of the carbon electrode, a disk between the seal and mix, a filling of paste between the mix and carton, a cover at the other end of the carton, means for attaching said cover to the carton adapted to provide an air-tight joint therebetween, and a zinc container electrode having a cylindrical portion adapted to be inserted in said paste adjacent the carton upon removing the cover, said zinc electrode having a vent hole and means adapted to close the vent hole when the zinc electrode is completely inserted in the paste.

8. In electric batteries, a moist mix, a carbon electrode in said mix having an end projecting therefrom, an insulating cap at the other end of said mix, a waterproof paper carton surrounding said electrode and mix spaced therefrom, a seal in one end of the carton surrounding the projecting end of the carbon electrode, a disk between the seal and mix, a filling of thickened cereal paste containing electrolyte between the mix and carton, a removable cover adapted to be fitted on the other end of the carton, a coating of paraffine over said cover and the adjoining end of the carton, and a zinc container electrode having a cylindrical portion adapted to be inserted in said paste adjacent the carton upon removing the cover, said container having a vent hole in the bottom thereof and a washer on the insulating cap adapted to close the vent hole when the zinc is forced into the paste.

9. In electric batteries, an inactive cell adapted to receive a zinc electrode to render the cell active, said inactive cell consisting of a moist mix, an electrode in said mix, an insulating carton surrounding the mix and spaced therefrom, a filling of paste between the carton and mix, means for closing one end of the carton, and a removable cover on the other end of the carton adapted to permit the zinc electrode to be inserted in the paste.

10. In electric batteries, a moist mix, a carbon electrode in said mix, an insulating carton surrounding the mix, means for closing one end of the carton, a filling of paste between the carton and mix, a removable cover on the other end of the carton, a zinc container electrode adapted to be inserted in said paste upon removing the cover, and means for electrically connecting a portion of the cover with said zinc container.

11. In electric batteries, a moist mix, a carbon electrode in said mix, an insulating carton surrounding the carbon electrode and mix and spaced therefrom, means for closing one end of the carton, a filling of paste between the mix and carton, removable means for closing the other end of the carton and a tubular electrode adapted to be inserted in the paste upon removing said last mentioned closing means.

12. In electric batteries, a moist mix, an electrode in said mix, an insulating carton surrounding said mix and spaced therefrom, a seal in one end of the carton, a filling of paste between the mix and carton, a cover at the other end of the carton, means for removably attaching the cover to the carton and a tubular electrode adapted to be inserted in the paste upon removing the cover, and means for electrically connecting the tubular electrode with a portion of the cover.

13. In electric batteries, a moist mix, an electrode in said mix, an insulating carton surrounding the electrode and mix and spaced therefrom, a seal in one end of the carton, a filling of paste between the mix and carton, a removable cover attached to the other end of the carton, and a sheet metal container electrode having a portion adapted to be inserted in the paste upon removing the cover, and means for electrically connecting the sheet metal container electrode with a portion of said cover.

14. In electric batteries, a moist mix, a carbon electrode in said mix, an insulating carton surrounding said electrode and mix and spaced therefrom, a seal in one end of the carton, a filling of paste between the mix and carton, a removable metallic cover attached to the end of the carton opposite the end having the seal, a zinc container electrode adapted to be inserted in the paste upon removing the cover, said container having a vent hole, and means for electrically connecting the metallic cover and zinc container electrode.

15. In electric batteries, a moist mix, a carbon electrode in said mix having an end projecting therefrom, an insulating cap at the other end of the mix, an insulating carton surrounding the carbon electrode and mix and spaced therefrom, a seal in one end of the carton surrounding the projecting end of the carbon electrode, a filling of paste between the mix and carton, means for attaching a metallic cover to the end of the carton opposite the end containing the seal, and a zinc container electrode adapted to be inserted in the paste adjacent the carton upon removing the metallic cover, said container having a vent hole in the bottom thereof.

16. In electric batteries, a moist mix, a carbon electrode in said mix having an end projecting therefrom, an insulating cap at the other end of the mix, an insulating carton surrounding said carbon electrode and mix and spaced therefrom, a seal in one end of the carton surrounding the projecting end of the carbon electrode, a disk between the seal and mix, a filling of paste between the mix and carton, a threaded ring at the other end of the carton, a threaded metallic cover fitting said ring and a zinc container electrode having a cylindrical portion adapted to be inserted in said paste adjacent the carton upon removing the cover, said zinc electrode having a vent hole, and means for electrically connecting the zinc electrode with the metallic cover.

17. In electric batteries, a moist mix, a carbon electrode in said mix having an end projecting therefrom, an insulating cap at the other end of said mix, a waterproof paper carton surrounding said electrode and mix and spaced therefrom, a seal in one end of the carton surrounding the projecting end of the carbon electrode, an insulating disk between the seal and mix, a filling of thickened cereal paste containing electrolyte between the mix and carton, a second insulating disk in said carton adjacent said paste, a threaded ring at the end of the carton opposite said seal, a threaded metallic cover fitting said ring and a zinc container electrode having a cylindrical portion adapted to be inserted in said paste adjacent the carton upon removing the cover, said container having a vent hole in the bottom thereof, and means for electrically connecting the metallic cover with the zinc electrode.

18. In electric batteries, a mix of manganese dioxide and carbon moistened with an electrolyte, a carbon electrode in said mix having an end projecting therefrom, an insulating cap at the other end of the mix, a waterproof paper carton surrounding said electrode and mix and spaced therefrom, a pitch seal in the end of the carton surrounding the projecting end of the carbon electrode, an insulating disk between the seal and mix, a filling of thickened cereal paste containing electrolyte between the mix and carton, a second insulating disk in said carton adjacent said paste, a metallic flange at the end of the carton adjacent the pitch seal, a threaded ring at the other end of the carton, a threaded metallic cover fitting said ring and a zinc can having a cylindrical portion adapted to be inserted in said paste and adjacent the carton upon removing the cover, said can having a vent hole in the bottom thereof and a spring attached to said bottom adapted to contact with said cover.

19. In a dry cell, an anode, a cathode, a cup-shaped container open at the top, said cup-shaped container at all times surrounding said cathode, said anode being initially outside of the cell, but being adapted to be inserted therein to activate it.

20. In a dry cell of the type where the electrolyte is kept out of operative position until it is desired to put the cell into use, a bobbin consising of a carbon electrode and a depolarizing mass, and a tubular sleeve of non-conducting material surrounding the bobbin and connected thereto.

21. In a dry cell of the type described, a bobbin consisting of a carbon electrode and a depolarizing mass, a tubular element of non-conducting material surrounding said bobbin, the tubular element being initially filled with electrolyte paste, and a zinc electrode initially out of contact with the paste but adapted to be positioned between said tubular element and said bobbin, and in contact with the electrolyte paste to activate the cell.

22. In a dry cell of the type described, a bobbin consisting of a carbon electrode and a depolarizing mass, a cup-shaped member of insulating material surrounding said bobbin and spaced therefrom, the space between the bobbin and the cup-shaped member being initially filled with electrolyte paste, and a zinc electrode initially out of contact with the paste but adapted to be positioned within the space afforded between said cup-shaped member and said bobbin and in contact with the electrolyte paste to activate the cell.

23. In a dry cell of the type described, a bobbin consisting of a carbon electrode and a depolarizing mass, a tubular element of non-conducting material surrounding said bobbin, connected thereto and spaced therefrom, the space between the bobbin and the tubular element being initially filled with electrolyte paste and a zinc electrode initially out of contact with the paste but adapted to be positioned within the space afforded between said tubular element and said bobbin and in contact with the electrolyte paste to activate the cell.

24. In a dry cell adapted to remain inactive until it is desired to put it into use, a cathode, means to depolarize the cathode, a tubular member surrounding said cathode, said tubular member being initially filled with electrolyte paste, and an anode being initially out of contact with the paste but adapted to be positioned between the cathode and said tubular member and in contact with the electroylte paste to activate the cell.

25. In a dry cell, an anode, a cathode, a cup-shaped member at all times surrounding said cathode but initially not surrounding the anode and spaced therefrom, the space between the cathode and the cup-shaped member being at all times filled with electrolyte paste.

26. In a dry cell of the type described, a tubular member of insulating material open at the bottom and having a closure at the top thereof, a bobbin electrode depending from said closure and centrally located within the tubular member, means between the bobbin electrode and the container to securely hold the bobbin electrode in its central position, said bobbin electrode having a brass cap secured upon its top forming an upper contact terminal, a quantity of electrolyte paste initially located in the container and substantially entirely covering the bobbin electrode, a closure fitting the bottom of said container, a cup-shaped zinc electrode open at the top and adapted to be inserted upwardly into the paste to surround the carbon electrode to activate the cell, the bottom of said zinc electrode forming the other terminal of the cell.

27. In a dry cell of the type described, a zinc electrode initially out of operative position, a bobbin initially embedded in the electrolyte paste, the cell being made active by moving the zinc electrode into operative position.

28. As an article of manufacture for use in dry cells of the type described, a bobbin surrounded by electrolyte paste, said paste being held in position by a container of non-conducting material, said container being temporarily hermetically closed but adapted for the reception and retention therein of a second electrode.

29. As an article of manufacture for use in dry cells of the type described, a container of non-conducting material, a bobbin within said container, an electrolyte paste within said container, and a closure for said container adapted to be removed to permit the insertion of a second electrode.

30. As an article of manufacture for use in dry cells of the type described, a bobbin initially surrounded by electrolyte paste and a container of non-conducting material.

In testimony whereof, we hereunto affix our signatures.

RAYMOND C. BENNER.
HARRY F. FRENCH.